United States Patent [19]

Kinsey

[11] 4,074,017

[45] Feb. 14, 1978

[54] BATTERY FOR ELECTRIC POWERED VEHICLES

[76] Inventor: Lewis R. Kinsey, Phoenix, Ariz.

[21] Appl. No.: 743,537

[22] Filed: Nov. 22, 1976

[51] Int. Cl.² .................. H01M 2/06; H01M 2/36
[52] U.S. Cl. ............................ 429/1; 429/49; 429/64; 429/95; 429/160
[58] Field of Search ............ 429/1, 49, 64, 76, 83, 429/95, 160

[56] References Cited

U.S. PATENT DOCUMENTS

| 3,781,175 | 12/1973 | Kinsey | 429/95 |
| 3,832,237 | 8/1974 | Kinsey | 429/49 |

Primary Examiner—Donald L. Walton
Attorney, Agent, or Firm—Warren F. B. Lindsley

[57] ABSTRACT

A wet cell storage type battery which may be quickly restored to a fully charged condition by the removal and replacement of its electrical generating elements or slowly recharged in the normal manner.

7 Claims, 9 Drawing Figures

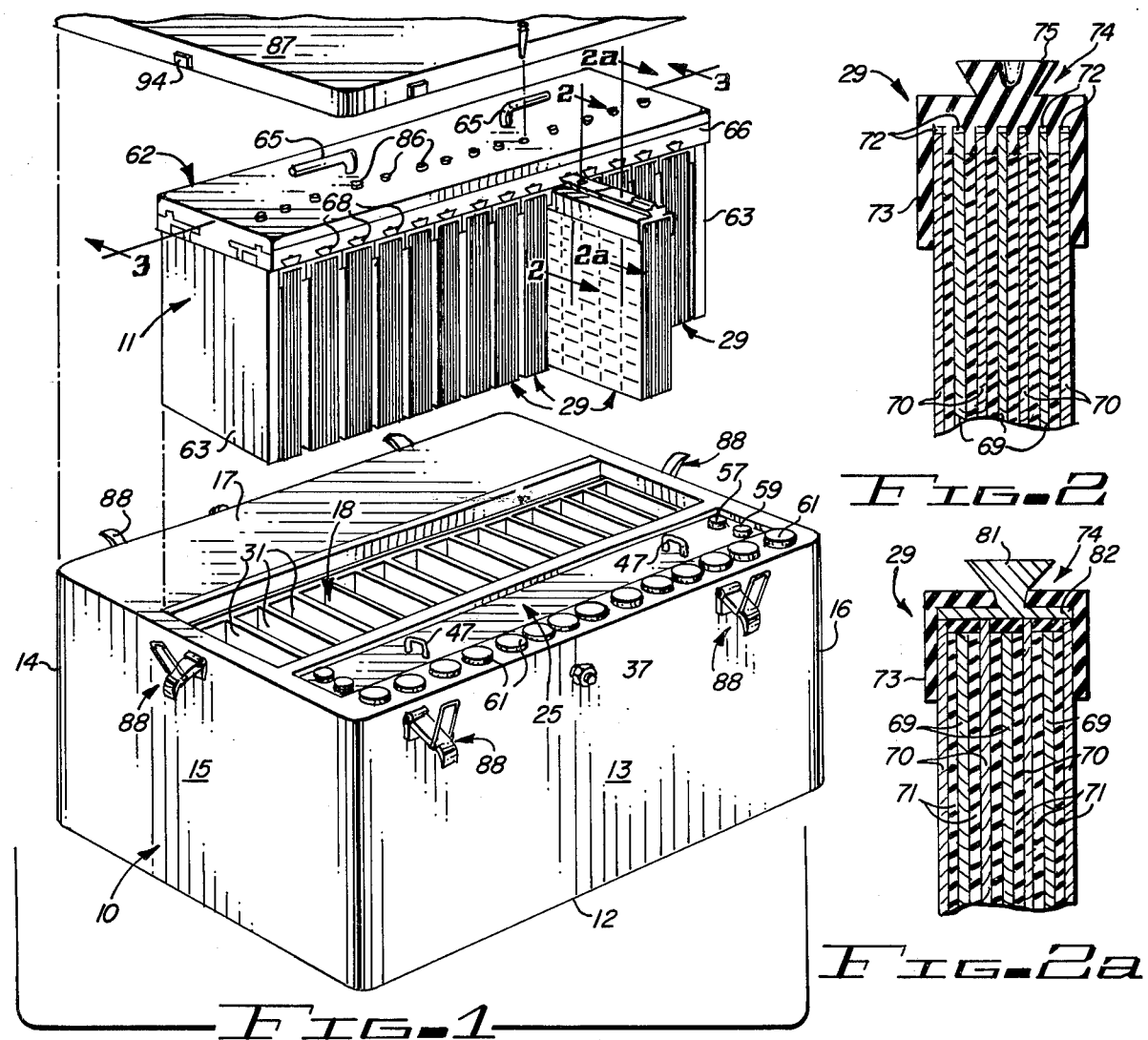
FIG-1
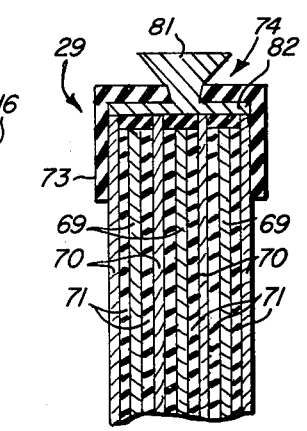
FIG-2
FIG-2a
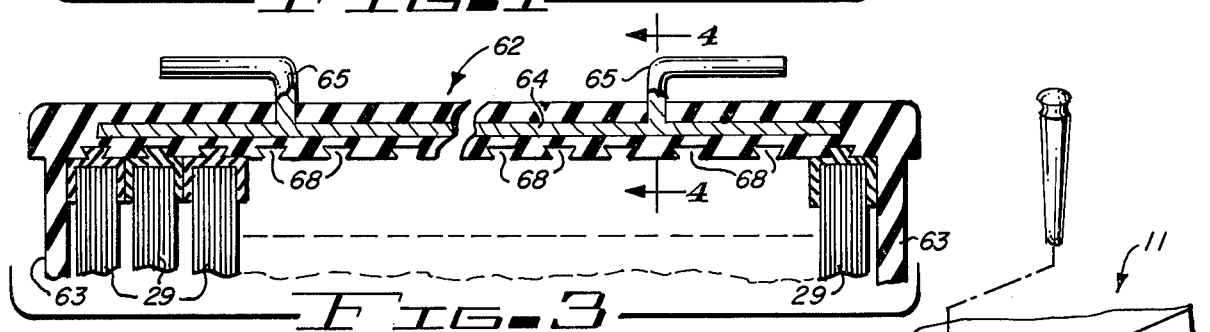
FIG-3
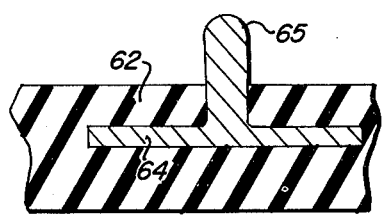
FIG-4
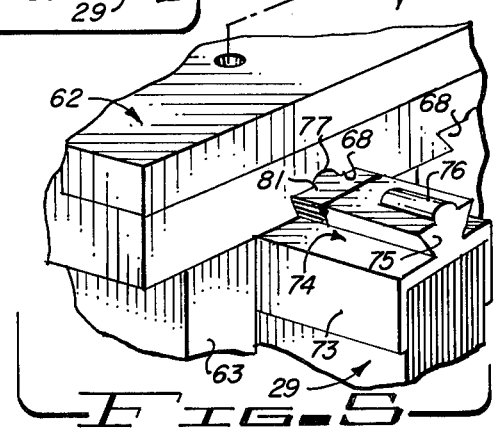
FIG-5

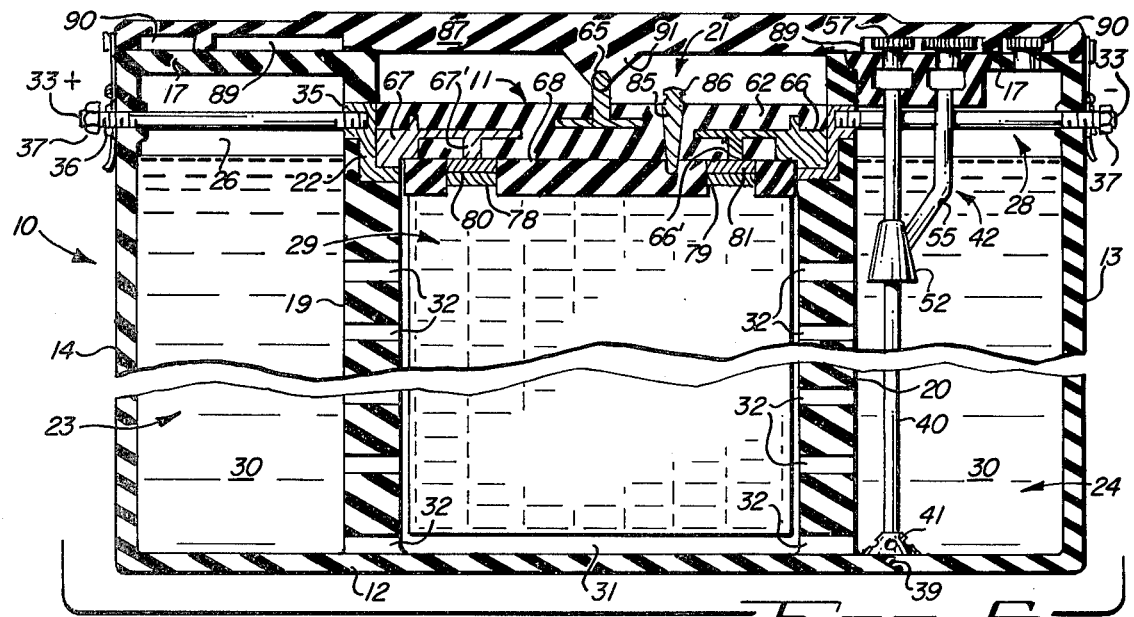
FIG-6
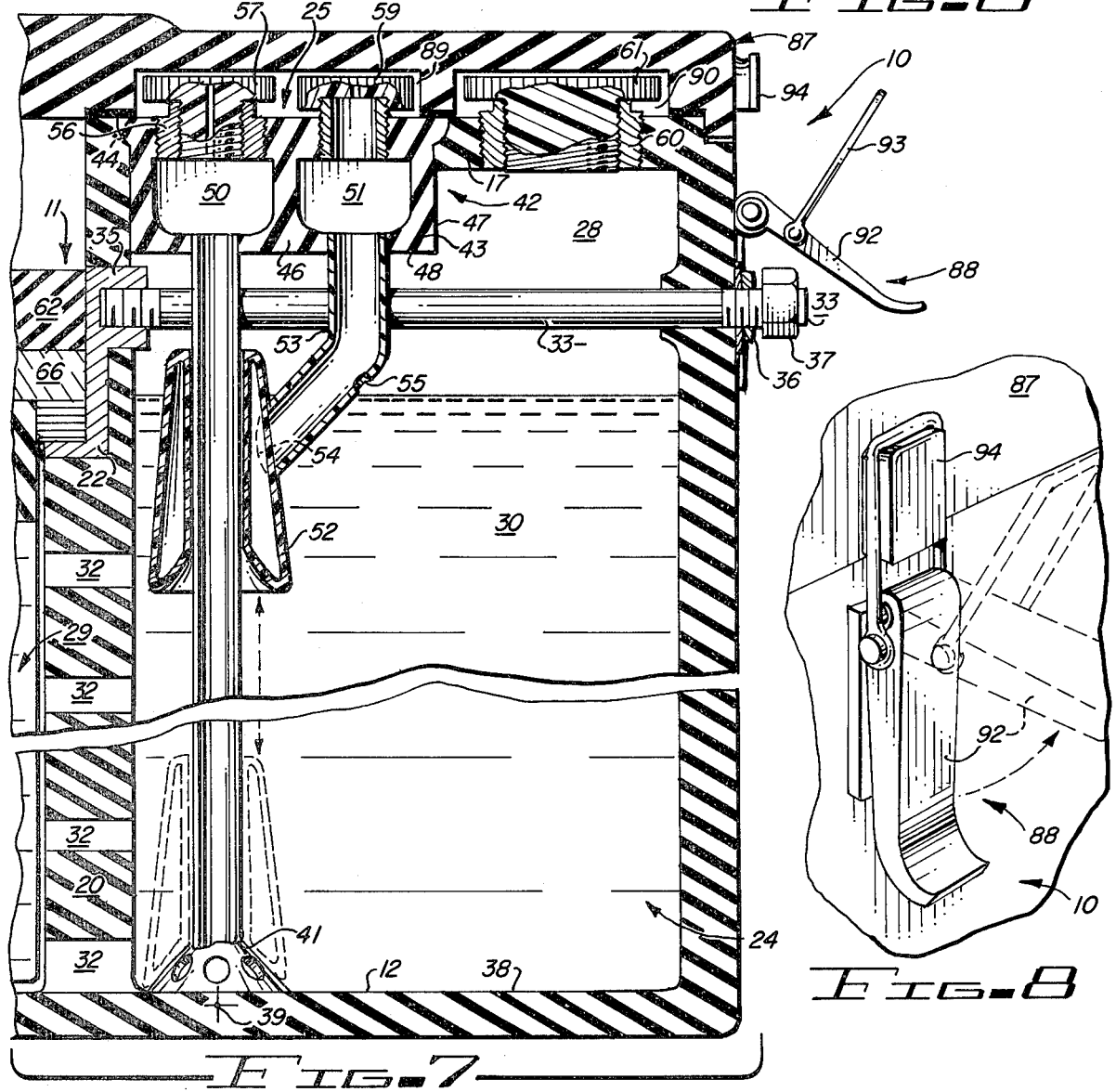
FIG-7
FIG-8

BATTERY FOR ELECTRIC POWERED VEHICLES

BACKGROUND OF THE INVENTION

This invention relates to improvements in wet cell storage batteries and more particularly to improvements in the encasement structure and the removable, replaceable electrical generating elements thereof, as originally disclosed in U.S. Pat. Nos. 3,781,175, 3,830,662, 3,832,237, granted to Lewis R. Kinsey and dated Dec. 25, 1973, Aug. 20, 1974, and Aug. 27, 1974 respectively. The improved battery is of the lead acid type capable of providing a high voltage source of power that can be utilized for direct propulsion of electric automobiles or the like.

1. Field of the Invention

This invention is directed to wet cell batteries of the lead acid type used as a power source for driving automobile engines or motors of the electric type which can be easily and quickly recharged by the replacement of its plates and battery acid.

2. Description of the Prior Art

It is well known that one of the limiting factors in the introduction and use of electrically powered vehicles, such as passenger cars, trucks and the like, is the short energy life of presently available storage batteries. Further, in order to adequately power an electric vehicle, the number of such batteries required for this purpose is prohibitive, mainly because the space requirements and combined weight of such a group of individual batteries would be excessive and tend to greatly increase the necessary space, power, maintenance requirements and costs of such an electrically powered vehicle.

It should be noted that the average, high-powered car battery available today weighs about 50 pounds including the weight of about 2 quarts of battery acid. According to recent tests, it would require at least 22 of these 50 pound batteries, weighing a total of 1100 pounds including only 11 gallons of battery acid to provide a test vehicle with a range of approximately 60 miles of driving before the power of the batteries is exhausted, necessitating subsequent recharging.

Even though recharging of the batteries can be undertaken periodically, such as overnight while the vehicle is not in use, this period of servicing is not satisfactory since the range of travel of the vehicle is unduly limited. In normal use it would be much faster to exchange a discharged battery than to recharge it; but when the power requirements for the propulsion of the vehicle necessitate the use of as many as 22 individual batteries, it would become an impractical, time-consuming task to accomplish such an exchange.

One way of overcoming the disadvantages of individual batteries for powering the vehicle with such a low range of travel would be to design, build and utilize a single battery having even greater power and considerably more range than the plurality of individual batteries so used. The feasibility of building and using such a battery for the intended purpose has been established, but because it would be too big, heavy and cumbersome to provide for a simple exchange of such a battery, a need exists for a new and improved battery from which the discharged electrical generating elements may be easily and quickly removed and exchanged for fully recharged elements.

It should be recognized that when a lead acid battery is fully charged, the electrolyte (battery acid) comprises a compound decomposable by an electric current into electronic ions, water and other solvents. When the battery is discharged, these ions are driven into the lead plates with the electrolyte becoming lighter in weight as shown by a hydrometer test. When the battery is recharged, these ions are driven out of the lead plates and back into the electrolyte and the electrolyte becomes heavier as shown by the hydrometer test.

This hydrometer test clearly demonstrates two very important factors, namely that the fluid electrolyte is a reservoir for the electronic ions when the battery is charged, and secondly, that the lead plates are the reservoir for the electronic ions when the battery is discharged.

In battery operation, the ions are produced by a dissolution of the electrolyte solution or compound.

The invention disclosed increases the ionic reservoir, both in the electrolyte as well as the lead plates to greatly increase the electrical output of the battery.

SUMMARY OF THE INVENTION

In accordance with the invention claimed, an improved storage battery having exchangeable, electrical generating elements is provided which may be quickly removed from the battery case and replaced with clean, fully charged elements within a minimum period of time and effort by a qualified attendant at a service station.

Although the improved storage battery of the present invention is relatively large in size, is provided with a greater number of larger lead plates than the conventional battery, and is capable of holding 50 gallons of fluid, it still would weigh much less (from 700 to 750 pounds) and provide a greater range of travel (270 miles) for the vehicle in which it is installed than the 22 conventional batteries, previously used and tested for the same purpose.

To increase the range of travel of the vehicle another 270 miles beyond its initial range, the cover portion of the battery is quickly detached from the case and lifted off to expose the lifting handles on the top surface of the lead plate assembly. The handles may be utilized to lift out the plate assembly as a single unit with a hoist and the discharged electrolyte is then pumped from all the cells of the battery at the same time through one chamber of a double manifold system. A newly recharged and clean replacement lead plate assembly is then carefully positioned in the battery case in the same position previously occupied by the removed discharged plate assembly. New electrolyte is then returned to each cell in accurately measured amounts through the other chamber of the double manifold system. The cover is then replaced and securely attached to the case and the vehicle so equipped may be on its way for another 270 or more miles of travel. This simple recharging operation takes only a matter of 12 to 15 minutes to perform.

In servicing this battery there are no electrical connections to make or break. The lead plates are always in contact with a pair of longitudinally extending bus bars imbedded in the top plate support member which are in contact with the battery terminals through permanent connecting means in the battery case. This connection is automatically broken when the discharged lead plate assembly is lifted out of the case and re-made again when a newly recharged plate assembly is returned and properly positioned in the battery case.

The top cover of the battery case when properly positioned and tightly clamped to the same serves two functions, namely to prevent the spilling and loss of fluid and to exert sufficient pressure on the handles of the plate assembly to firmly hold down and stabilize the same in the battery case, thereby providing good electrical connections to the terminals.

It is, therefore, the principle object of this invention to provide a greatly improved storage battery of a single unit construction that in association with other propulsion means is capable of providing sufficient electrical motive power for propelling an automobile or other vehicle a greater distance over a longer period of time than heretofore thought possible before recharging.

Another object of this invention is to provide an improved storage battery in which the discharged, internal electrical generating elements, including the electrolyte, may be removed from the battery case and replaced with clean, fully charged elements and fluid in a matter of minutes for recharging purposes.

Another object of this invention is to provide an improved storage battery having a dual manifold system, one chamber of which with its cell communicating components is used to exhaust a vast amount of spent electrolyte from all of the cells of the battery at the same time. The other chamber together with its cell communicating components is used to simultaneously refill all the cells of the battery up to a predetermined level with fresh electrolyte. The dual manifold system is capable of being removed from the battery case for cleaning and replacement purposes.

A further object of this invention is to provide a new and improved battery structure in which the wattage rating of the battery is increased without increasing its weight.

A still further object of this invention is to provide an improved battery structure employing a large fluid capacity case divided transversely by walls into three separate communicating compartments and longitudinally by a plurality of this parallel aligned walls that form the cells of the battery.

A still further object of this invention is to provide a new method of recharging a battery within a minimum length of time.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 1 is an exploded perspective view of a battery of the wet cell storage type, embodying features of the invention and showing the case with its cover and some of the internal elements removed therefrom for purposes of illustration.

FIG. 2 is a fragmentary transverse, vertical sectional view of an individual cell assembly, shown in FIG. 1 taken along the line 2—2, removed from the top support plate of the complete cell assembly.

FIG. 2a is a transverse, vertical sectional view similar to FIG. 2 of the partly removed individual cell assembly taken on the line 2a—2a of FIG. 1 and showing the method of utilizing a portion of the dove-tail cell support member as an electrical conductor for the negative lead plates of the cell.

FIG. 3 is a fragmentary, vertical, longitudinal view taken on the line 3—3 of FIG. 1 through the top cell support plate and depending ends of the cell assembly and showing the method of reinforcing the cell support plate by extending the flat, imbedded, integral portion of the lifting handles adjacent to the ends of the plate and the female dovetail slots in the underside of the plate which are used to receive and support the individual lead plate assemblies by their male counterparts.

FIG. 4 is a fragmentary transverse sectional view taken on the line 4—4 of FIG. 3 showing the relationship of the flat imbedded reinforcing portions of the lifting handles to the dove-tail shaped, transverse slots.

FIG. 5 is a fragmentary perspective view of a corner portion of the complete plate assembly showing one of the individual plate assemblies partly removed from its dove-tail supporting slot to better illustrate the means of assuring that the male body portions of the dove-tails on the cell assemblies can only be inserted into their female counterparts from only one side of the support plate.

FIG. 6 is a transverse vertical sectional view taken at the longitudinal mid-section of the completely assembled battery showing the relationship of the various parts of the battery.

FIG. 7 is an enlarged, fragmentary transverse vertical sectional view of the assembled battery shown in FIG. 6 taken through an end cell of the same and illustrating the dual manifold system with its cell communicating components, capped exhausting and filling means and the separate, capped emergency inspection means.

FIG. 8 is an enlarged, perspective view of a clamping means utilized for securing the battery cover to one side and end of the battery case.

DESCRIPTION OF THE PREFERRED EMBODIMENT

Referring more particularly to the drawings by characters of reference, FIGS. 1, 6 and 7 disclose a wet cell storage battery similar to the type generally used for lighting, starting and propulsion of various vehicles, which is an improvement over the batteries shown and described in U.S. Pat. Nos. 3,781,175, 3,830,662, and 3,832,237 previously mentioned.

This improved battery comprises a battery case or tank-like container 10 having a removable, replaceable grid or plate holder assembly 11.

The battery case 10 is made from a non-conductive material such as hard rubber or a plastic composition, the strength of which may be greatly increased by imbedding suitable non-conductive reinforcing material (not shown) in its structural walls. In its preferred form as shown, the battery case 10 is a rectangular-shaped box-like structure having a bottom or base 12, vertical side walls 13 and 14, end walls 15 and 16 and a cover portion 17. The covered area is equal to about one-quarter of the overall width of case 10 and is formed as an integral part thereof. The top central area of the case if formed to provide a rectangular opening 18 of any desired width which extends longitudinally to the inside of the end walls 15 and 16.

Opening 18 together with longitudinally disposed vertical supporting partitions 19 and 20 define a container area or central cavity 21 which extends upwardly from bottom 12 through the top cover portion 17 of the battery case 10. Cavity 21 is provided with an inside ledge around its rectangular perimeter which is formed by reducing the thickness of the vertical supporting partitions 19 and 20 and the end walls 15 and 16 of the battery case a predetermined distance down from the top of the rectangular opening 18. This ledge together with "L"-shaped, metallic conducting connector members 22 imbedded or otherwise secured on both sides of the reduced, upper portions of cavity 21 and extending longitudinally its full length are adapted to receive and support the grid or plate holder assembly 11.

Supporting partitions 19 and 20 together with the side walls 13 and 14 and end walls 15 and 16 of the case define two equally sized longitudinally extending chambers 23 and 24. These chambers extend from bottom 12 to the top cover portions 17 on each size of the central cavity 21 of case 10. Chamber 23 is completely closed on three sides and chamber 24 is substantially closed on three sides with the exception of a narrow, rectangular-shaped opening 25, formed in the right side of cover portion 17.

Chambers 23 and 24 and the mid-section cavity 21 are divided longitudinally by a plurality of aligned transverse walls 26, 27 and 28, respectively. Partition walls 26 and 28 extend upwardly from bottom 12 of the case to top cover portions 17, thereby dividing said chambers into a plurality of substantially closed compartments 30. Partition walls 27 extend upwardly from bottom 12 of the case in the central cavity 21 a distance which is determined by the height or length of the individual plate assemblies 29 relative to the location of the perimeter ledge in the top open area 18 which supports the grid or plate holder assembly 11, thereby dividing the central cavity 21 into a plurality of open top containers or cells 31 which are adapted to receive and contain the individual plate and separator assemblies 29 of the battery.

It should be noted that the containers or cells 30 formed in the side chambers 23 and 24 and the containers or cells 31 formed in the central cavity 21 are in direct transverse alignment with each other and communication therebetween is obtained by means of a plurality of distribution holes 32 in the dividing and supporting partitions 19 and 20 of the case. These holes permit free flow of fluid between the individual cells to provide for complete extraction of the fluid from the battery case 10.

A pair of terminal connector posts 33, one positive and one negative, of suitable non-corrosive, conducting material are inserted through aligned bores located either at the mid-section and near the top of the battery case side walls 13 and 14 (as shown) or adjacent either end of the same. These parts are removably secured in the longitudinally extending connector members 22 on each side of the rectangular opening 18 of the cavity 21. Bosses 35 forming an integral part of members 22 project outwardly through aligned holes in the supporting partitions 19 and 20 and are provided with tapped holes which are adpated to receive the threaded inner ends of terminal connector posts 33. The threaded ends of the terminal post 33 project outwardly from the side walls of the case and are provided with sealing washers 36 and nuts 37 for securely connecting a positive power cable and a negative ground cable (not shown) thereto in the usual manner.

The inside top surface 38 of bottom 12 of the case gradually slopes downwardly from the side walls 13 and 14 to a point 39 located in the right-hand side chamber 24 thereby forming a trough so that all of the acid contained in the case will flow through the lowermost holes 32 at the bottom of the longitudinal partitions 19 and 20 of each cell. At this location, the liquid may be easily and quickly evacuated by suction tubes 40. These tubes having flaired or conical-shaped bottom ends 41 containing inlet holes normally resting on the inside top surface 38 of bottom 12 of the case and comprise components of a dual manifold system 42.

The dual manifold system 42 is utilized for the purpose of filling, removing or adding suitable liquids to the various compartments of battery case 10 and comprises an assembly of component parts which may be inserted or removed as a unit from cells 30 of compartment 24 of the battery case through the narrow, rectangular-opening 25 provided in the top cover portion of the case.

This manifold system includes a top header portion 43 which is preferably fabricated of the same material as the battery case 10 and is provided with an arcuate lip or projection 44 around the rectangular periphery of its top exposed side which is adapted to be received in mating, supporting relationship in an arcuate, concave depression 45 formed around the inside periphery of the longitudinally extending rectangular opening 25 to thereby act as a supporting means for the entire manifold system, as shown in FIGS. 1, 6 and 7 of the drawings.

The top header portion 43 of the manifold system 42 is provided with an integral depending portion 46 which is accurately sized to fit snugly but removably in the longitudinally extending open area between the inside vertical face of the supporting partition 20 and the vertical ends and right side of the opening 25 of the cover portion 17 of the battery case 10. To this end the right, outside face of the depending portion of header 43 is provided with a slight slope (about 3 degrees) to allow for its easy removal or insertion. Suitable spacing lifting eyes 47 are imbedded in its flat-topped surface, as indicated in FIG. 1.

The top header portion 43 of the manifold system 42 is provided with a pair of parallel, longitudinally formed chambers 50 and 51 that extend the full length of the header. These chambers are used separately for evacuating and filling the battery case with fluid. The left hand evacuation chamber 50 is provided with a plurality of accurate, longitudinally spaced vertical bores on its bottom side in transverse alignment with the centers of each of the cells or containers 30 formed in the side chamber 24 of the battery case 10. Into each of these vertical bores a suction tube assembly is provided comprising a tube 40 having a conical flaired end 41 with several apertures therein. A tapered cylindrical float member 52 having a central bore is slidably mounted on tube 40. The tube is suitably secured at its top end in vertical bores in cavity 50. The flaired end 41 of tube 40 rests on the top inside surface 38 of base 13 of the battery case with the tapered float members being positionable on the flaired ends 41 of tube 40 (as shown in FIG. 7 in dash lines) whereby it closes off the apertures therein when the compartments and cells of the battery case are empty.

The right hand filling chamber 51 is also provided with a plurality of longitudinally spaced vertical bores in its bottom ends that are in transverse alignment with the centers of the bores in chamber 50 and in cells 30. Into each of said bores the top end of a short length of tubing 53 is inserted and secured by cementing or otherwise. These short lengths of tubing extend downwardly and at a point about midway in their length are bent forwardly at about a 45 degree angle in transverse alignment with the vertically depending suction tubes 40. Tubing 53 extends a sufficient distance toward tubes 40 to allow their contoured open ends 54 to be closed off by contact with the diametrical tapered outer surface of the float members 52 as they float upwardly in each individual cell 30 of the battery case 10 as it is being filled with fluid. In this manner a means is provided for limiting the amount and level of acid in the battery case.

Each of the short lengths of tubing 53 are provided with a small aperture 54 just below their point of bending which communicates with the interior of cells to allow for draining any excess fluid that may be contained in chamber 51 after the battery filling operation has been completed to prevent any electrical shorts between the cells through the fluid in the manifold.

In order to provide for the separate evacuation and filling operations of acid from or into all the cells of the battery case at the same time without any possible error of getting the hoses from the evacuation equipment or the hoses from the filling source reversed in their connection to the proper outlets and inlets of the respective chambers 50 and 51, the top header portion 43 of the dual manifold system is provided with two pairs of internally threaded apertures that communicate with the respective chambers 50 and 51. One relatively large pair of threaded apertures communicating with the evacuation chamber 50 are each provided with a non-corrosive, internally threading bushing 56 adapted to receive the male threaded ends of suction hoses (not shown) or removable vent caps 57. The other pair of threaded aperatures somewhat smaller in diameter and communicating with the filling chamber 51 are provided with non-corrosive externally threaded bushings 58. These bushings have hollow bores which extend upwardly beyond the flat top of the header portion 43 of the dual manifold 42 and are adapted to receive the female threaded ends of filling hoses (not shown) or removable vent caps 59.

A plurality of internally threaded apertures located in longitudinal alignment adjacent the outside edge of cover portion 17 of the battery case 10 and centered directly above each of cells 30 in direct communication therewith, are provided with non-corrosive internally threaded bushings 60. These bushings project upwardly beyond the flat top of cover portion 17 and are adapted to receive the male threaded ends of suitable vent caps 61 which when removed are intended to provide access to each of the respective cells 30 for inspection and emergency purposes only.

A top plate or supporting member 62 made of hard rubber, a plastic composition or any other suitable, non-conductive material is provided for extending with slight clearance longitudinally over the supporting partitions 19 and 20 within the rectangular opening 18 of the battery and being supported on the ledge upon which the top plate supporting member 62 is adapted to rest in level horizontal relationship.

Top plate supporting member 62 is provided with integral, inwardly offset, depending end members 63 which extend with some clearance almost to the inside top surface 38 of the bottom 12 of the battery case in the central cavity 21. These end members are utilized to shield and prevent damage, especially to the end units of the plurality of individual plate assemblies 29 that are attached in depending relation to the bottom surface of this support plate and can support these plate assemblies out on a bench or on the floor for a short period of time, if necessary. They act as a guiding means for the grid of plate holder assembly 11 as it is lowered into opening 18 and into cells 31 in the central cavity 21 of the case. Top plate supporting member 72 is also provided with a reinforcing member 64 in the form of a narrow rectangular plate that is imbedded in the body thereof and extends longitudinally to the near ends of the same. Member 64 is provided with a pair of lifting members or handles 65 that are integral therewith and extend upwardly in centered and spaced relationship from each other and are bent at right angles in opposite directions. These components are required to strengthen the top plate supporting member 62 so that it can adequately support the plurality of individual plate assemblies 29 in their individual cells 31 of the central cavity 21 of the battery case and to prevent damage or collapse of the plate support member 62 itself while the complete assembly is being lifted from the case for servicing and reinstallation therein.

A pair of non-corrosive lead bus bars 66 and 67 are imbedded in the sides of plate supporting member 62 and extend longitudinally thereof its full length in reversed, right and left hand relationship. These bus bars act as additional reinforcing means for the top plate support member 62 and are each provided with longitudinally extending, depending projections that extend downwardly through the top surface of a plurality of longitudinally spaced transverse dove-tail cut-outs or grooves 68 formed in the bottom underside surface of the plate supporting member 68. The bus bars 66 and 67 are of dissimilar polarity (negative and positive) and are adapted to contact the negative and positive lead plates in the individual plate assemblies 29.

A predetermined number of grids or positive plates 69 and negative grids or plates 70 together with plate separators 71 arranged therebetween are assembled into compact groups (see FIGS. 2 and 2a) with each plate being inserted at its top end in a plurality of grooves 72 of the positive and negative plates. These grooves are formed in the underside surface between the depending side flanges of a channel shaped header member 74 that is a little wider than the respective plates and separators so that the exposed end sides of the same are in flush alignment.

The total sum of the assembled thickness of each group of plates and separators is slightly less than the distance between the cell partition walls 27 which form cells 31 in the central cavity 21 of the battery case 10. The overall width of each group is slightly less than that of cells 31 to provide for easy insertion or removal of the same into or from said cells and to allow for circulation of fluid about their respective sides and ends. The total thickness of each individual plate assembly 29 at its top end, which includes the depending side flanges 73 of their header members 74, is such that the side faces of the depending flanges lie adjacent each other with slight clearance therebetween when the plate assemblies 29 are installed in the top plate supporting members 62 of the removable, replaceable grid or plate holder assembly 11.

The channel shaped header members 74 of the individual plate assemblies 29 are preferrably fabricated of the same insulative plastic material as the top plate supporting member 62 and are provided with integral male dove-tail shaped, centrally located projections 75 on their top surfaces that extend from end to end of the header members. These projections are sized to fit in sliding relationship in the female, dove-tail shaped cut-outs or grooves 68 formed in the underside of the plate supporting member 62.

These male, dove-tail shaped projections are provided at one end only with a comparatively short, centrally located convex projection 76 (as seen in FIG. 5)

which is adapted to mate with concave depressions 77 of slightly greater length. The concave depressions are centrally located and formed at one end only in the underside of the top surface of the female, dove-tail cutouts 68 which together act as a means for preventing any possibility of the individual plate assemblies 29 with their male dove-tail projections 75 being inserted in the female, dove-tail shaped cutouts 68 of the top plate supporting member 62 from the wrong side of said member thereby reversing the polarity of the positive and negative plates by improper contact with the positive and negative bus bars 67 and 66 respectively.

The positive plates 69 and the negative plates 70 are provided at locations adjacent their respective sides with upstanding tabs 78 and 79 which project upwardly from the top edges of the plates and extend through spaced cutouts adjacent the ends of the respective grooves 72 in the header member 74. They project up through the cutouts in such a manner as to contact the bottom surface of separate non-corrosive, metallic contact members 80 and 81, the top projecting portions of which are of the same shape and adapted to align with the dove-tail projecting members 75. Their projecting ends and transversely extending flat bottom portions 82 are imbedded in the header members 74 of the plate assemblies 29 so as to bring the upward projecting tabs 78 and 79 of the positive and negative plates into contact with the depending longitudinally extending projections 66' and 67' of the negative and positive bus bars 66 and 67, respectively, when the male dove-tail shaped projections 75 are inserted in proper supporting relationship in the female dove-tail shaped cutouts or grooves 68 in the top plate supporting member 62. The complete removable, replaceable plate holder assembly 11 then may be lowered into the central cavity area 21 of the battery case to automatically make contact with the positive and negative terminal connector posts 33 through the bus bars 66 and 67 and the ∓L"-shaped connector members on which it normally rests.

In order to prevent lateral movement of the individual plate assemblies 29 when installed and supported in the female dove-tail grooves of top plate member 62, a plurality of vertically disposed, mating tapered holes 85 are provided in spaced longitudinally aligned relationship in the top supporting plate 62. These holes extend a short distance downwardly into the top of the dove-tail male projections 75 of the header members 74 of each of the plate assemblies 29 and are adapted to receive removable tapered pins 86 that extend into those portions of the tapered holes to prevent lateral movement thereof and maintain the associated relations of their electrical contacts, as shown in FIGS. 1 and 6 of the drawings.

After the fresh, fully charged electrical elements of the battery have been installed in its case 10 and the cells of the same have been filled up to a predetermined level with clean fresh electrolyte (acid water mix), a lid or cover 87 is securely attached thereto by suitable hold-down means. Such a device may comprise the clamping devices 88 illustrated in FIG. 8 of the drawings. The lid or cover 87 is fabricated of the same hard rubber or plastic composition as the battery case 10 with its depending perimeter side and end flanges preferably notched out and extending downwardly below the top surfaces of the cover portions 17 of the case into cutouts of notches formed at the top intersection of the cover portions 17 and the sides and end walls, 13, 14, 15 and 16 of the same to prevent lateral or longitudinal movement thereof and aid in guiding it when being installed over the top of case 10.

Cover 87 is thicker in its central portion and is provided with a pair of double longitudinally extending rectangular cavities 89 and 90 formed in the underside of the cover to provide the necessary clearance for vent caps 57 and 59 that are installed in the top surface of the dual manifold header portion 43 and the vent caps 61 that are installed in the right hand portion of the cover portion 19 of the case 10. These rectangular clearance areas are of identical size and area and are located symmetrical on both sides of the cover so that the same could be installed with either of its sides and ends facing in either direction relative to the sides and ends of the case and still perform its intended function of sealing off the top open portions of the case from leakage or loss of fluid in case of accidental tipping or turning over of the vehicle in which the battery is installed.

Cover 87 may be provided with suitable, soft compressible sealing strips or gaskets at all points where it contacts the cover portions 17 and the top end surfaces of supporting partitions or vertical walls of the case. It is also provided with a pair of integral, angular depending members 91 having concave, semicircular bottom ends that are located on the underside of the central portion of the cover in longitudinal spaced relationship so as to be in direct vertical relation over the lifting members or handles 65 in the top plate supporting member 62 of the grid or plate holder assembly 11 when installed as described in the central cavity 21 of the case 10.

When cover 87 is clamped by means of the two part clamping devices 87 each comprising an operating lever portion 92 having a spring type "U"-shaped hook members 93 pivoted in offset relationship thereto they secure the sides and ends of the case adjacent their top ends. Latch members 94 having an arcuate grooved outside perimeters are secured to the depending sides and ends of the cover in direct vertical alignment with the operating lever portions 92 of the clamping devices 88 in such a manner that when the U-shaped, spring-type hook members 93 are placed over and in the arcuate grooves of the latch members 94 on the cover and the operating levers 92 and are forced down in vertical relationship to the sides and ends of the case, the spring members impose downward pressure on the latch members 94 to bring down and hold the concave ends of angular depending members 91 on the underside of the cover into contact with the cylindrical portions of the lifting members or handles 65 in the top plate supporting member 62 of the grid or plate holder assembly 11. These clamps securely hold the cover in the central cavity 21 of the battery case 10. At the same time sufficient downward pressure is provided on the contacting points of the cover (or the soft compressible sealing strips or gaskets, if any) to provide a sturdy leakproof cover means which may be quickly and easily removed and reinstalled when necessary.

The battery as shown and described has fourteen electric power producing cells and generally produces approximately 2 volts per cell or 28 volts when fully charged.

The lead plates and separators contained in each cell of the battery are much larger than conventional plates and therefore provide greater surface areas to fully absorb the acid from the electrolyte to produce more electrical energy for a greater period of time than heretofore possible.

The acid water solution or electrolyte capacity of the battery case is many times greater (in this case 50 gallons) than the capacity of a conventional battery and the provisions for thoroughly distributing the electrolyte into and out of the current generating cells of the battery allows for greater absorption of acid by the plates and less dilution of the electrolyte over a longer period of time.

USAGE

This battery is intended primarily for use as a motive power unit for propulsion, lighting and other electrical requirements for cars or other highway-type vehicles but may be used to power many other types of commercial vehicles such as lift trucks, tractors and the like.

The battery is much larger and heavier than a conventional automotive battery but would occupy less space and be lighter than an internal combustion engine and battery which it and a suitable electric motor would replace.

SERVICING REQUIREMENTS

All batteries of the wet cell storage type require occasional servicing such as the addition of water to the cells, recharging and sometimes major repairs or rebuilding. When a fast recharge is required of a conventional battery it is usually accomplished with suitable charging equipment available in most service stations with the battery remaining in the vehicle. Because a slow charge procedure requiring several hours to complete is more satisfactory than the so-called quick charge procedure which does not fully charge the battery, it is usually not utilized since it ties up the vehicle for long periods of time.

The battery of this invention has been designed to furnish enough electrical motive power to propel the vehicle for considerable distances before reaching a discharged condition and then to be renewed or recharged at a properly equipped service station in a very short period of time (as little as 12 to 15 minutes).

Recharging or renewing of this battery in a minimum length of time can be accomplished as follows:

An attendant providing battery service removes the cover portion of the battery from the case and lifts it off to expose the lifting handles on the top surface of the lead plate assembly. The handles may be utilized to lift out the plate assembly as a single unit with a hoist and the discharged electrolyte is then pumped from all the cells of the battery at the same time through one chamber of a double manifold system. A newly recharged and clean similar replacement lead plate assembly is then carefully positioned by a hoist in the battery case in the same position previously occupied by the removed discharged plate assembly. New electrolyte is then returned to each cell in accurately measured amounts through the other chamber of the double manifold system. The cover is then replaced and securely attached to the case and the vehicle so equipped may be on its way for another 270 or more miles of travel.

The above servicing procedure, requiring only 12 to 15 minutes to complete, results in a fully charged battery capable of powering the vehicle for many more miles.

It should be understood that the battery of this invention could be recharged in the conventional manner with suitable charging equipment in a service station or at home by a simple connection to an automatic overnight charger, which should be an accessory carried by each car.

Although but one embodiment of the present invention has been illustrated and described, it will be apparent to those skilled in the art that various changes and modifications may be made therein without departing from the spirit of the invention or from the scope of the appended claims.

What is claimed is:

1. A storage battery of the wet cell type having a plurality of cells, each cell being provided with a group of plates having post members extending upwardly from each plate into the upper portion of the cells comprising:
    a box-like battery case having partitions dividing the same into at least two compartments,
    one of said compartments being open at the top of said battery case for the reception of said cells and the other of said compartments being closed at the top of said battery case and being used for the storage of an extra supply of electrolyte over that utilized in said one of said compartments,
    a removable plate assembly for positioning in said one of said compartments,
    said plate assembly comprising a supporting member arranged to receive in interlocking relationship a plurality of groups of plates detachably and spacedly arranged along said supporting member, said groups of plates being insulated one from the other when in a juxtapositioned arrangement, bus bars extending longitudinally of and within said plate assemblies for connecting together the post members of the plates of said groups of plates in positive and negative voltage orientation,
    means for inter-connecting corresponding cells in said plate assembly and said other compartment for providing passageways for the free flow of electrolyte therebetween, and
    a cover for said box-like battery case extending over at least one of said compartments,
    said supporting member being spacedly grooved to receive in interlocking relationship in said grooves a plurality of groups of said plates spacedly arranged with one group of plates detachably positioned in each of said grooves,
    each group of plates being a complete cell assembly removably mounted as a cell structure on said supporting member,
    each cell assembly being provided with a projection which cooperates with its associated groove to restrict the insertion of each group of plates into one end only of the grooves.

2. The storage battery set forth in claim 1 wherein:
    said cover is provided with means for aiding in simultaneously holding the plates of said groups of plates in firm contact with said bus bar assembly.

3. The storage battery set forth in claim 1 wherein:
    said bus bars extend longitudinally of and within said supporting member plate for connecting together the post members of the plates of said group of plates.

4. The storage battery set forth in claim 1 wherein:
    said grooves extending laterally across said supporting member, and
    said groups of plates are each insertable into one of said grooves from a common end thereof.

5. The storage battery set forth in claim 1 in further combination with:
- means extending into the other of said compartments for filling and draining the electrolyte placed therein,
- said means comprises a manifold system providing a pair of chambers extending longitudinally of said battery case within said other compartment, one utilized for filling and the other for draining electrolyte from said other compartment,
- at least one hollow tube extending from said other of said chambers to the bottom of said other compartment for draining electrolyte therefrom through said tubing and into said other of said chambers,
- said tubing having at least one aperture near the bottom of said other compartment connecting the hollow interior of said other of said compartments with the hollow interior of said tube, and
- a float slidably mounted on said tube for closing said aperture when the electrolyte level in said other of said compartments reaches a given low level.

6. The storage battery set forth in claim 5 in further combination with:
- a second, hollow tube extending from said one of said chambers into said other of said compartments for conducting electrolyte thereinto,
- said float closing said second tube when the electrolyte level in said other of said compartments reaches a given high level.

7. The storage device set forth in claim 6 in further combination with:
- a drain hole in said second tube for draining the electrolyte from said second tube when it is closed by said float.

* * * * *